(12) United States Patent
Pearson et al.

(10) Patent No.: US 10,075,359 B2
(45) Date of Patent: *Sep. 11, 2018

(54) DYNAMIC CONTENT DELIVERY SYSTEMS AND METHODS FOR PROVIDING SAME

(71) Applicant: Gregory A. Pearson, Inc., Dunedin, FL (US)

(72) Inventors: Gregory A. Pearson, Dunedin, FL (US); David B. Hall, New Port Richey, FL (US); Ronald Shane Hamilton, St. Petersburg, FL (US)

(73) Assignee: Gregory A. Pearson, Inc., Dunedin, FL (US)

( * ) Notice: Subject to any disclaimer, the term of this patent is extended or adjusted under 35 U.S.C. 154(b) by 88 days.

This patent is subject to a terminal disclaimer.

(21) Appl. No.: 15/226,781

(22) Filed: Aug. 2, 2016

(65) Prior Publication Data

US 2016/0344602 A1    Nov. 24, 2016

Related U.S. Application Data

(63) Continuation of application No. 14/611,531, filed on Feb. 2, 2015, now Pat. No. 9,420,024, which is a
(Continued)

(51) Int. Cl.
*G06F 15/16* (2006.01)
*H04L 12/26* (2006.01)
(Continued)

(52) U.S. Cl.
CPC .... *H04L 43/0858* (2013.01); *G06F 17/30905* (2013.01); *H04L 43/0888* (2013.01); *H04L 43/106* (2013.01); *H04L 43/12* (2013.01); *H04L 43/50* (2013.01); *H04L 47/365* (2013.01); *H04L 65/60* (2013.01); *H04L 65/80* (2013.01); *H04L 67/02* (2013.01)

(58) Field of Classification Search
USPC ....... 709/219, 203, 217, 223, 200, 201, 218, 709/224, 202, 316, 246, 231
See application file for complete search history.

(56) References Cited

U.S. PATENT DOCUMENTS

| | | | |
|---|---|---|---|
| 6,144,996 A | 11/2000 | Starnes et al. | |
| 6,425,005 B1* | 7/2002 | Dugan | H04M 15/90 379/201.01 |

(Continued)

*Primary Examiner* — Jude Jean Gilles
(74) *Attorney, Agent, or Firm* — Troutman Sanders LLP; James E. Schutz; Christopher C. Close, Jr.

(57) ABSTRACT

Content delivery systems and related methods can provide dynamic content across a network, based on detected network performance. An exemplary method can include transmitting a request to deliver requested content over a network. The method can further include transmitting a first confirmation responsive to receiving a test packet. Additionally, the method can include receiving, a first data set that is at least a first portion of the requested content and which includes a second request for confirmation, and transmitting a second confirmation. Finally, the method can include receiving a second data set, the second data set that is at least a second portion of the requested content and that is different from the first portion of the requested content.

20 Claims, 6 Drawing Sheets

Related U.S. Application Data continuation of application No. 14/139,342, filed on Dec. 23, 2013, now Pat. No. 8,949,379, which is a continuation of application No. 12/911,322, filed on Oct. 25, 2010, now Pat. No. 8,615,569.

(51) Int. Cl.

| | | |
|---|---|---|
| *G06F 17/30* | (2006.01) | |
| *H04L 29/08* | (2006.01) | |
| *H04L 12/805* | (2013.01) | |
| *H04L 29/06* | (2006.01) | |
| *G06F 13/00* | (2006.01) | |

(56) References Cited

U.S. PATENT DOCUMENTS

| | | | |
|---|---|---|---|
| 6,430,617 B1 | 8/2002 | Britt et al. | |
| 6,480,896 B1 | 11/2002 | Brown et al. | |
| 7,012,900 B1 | 3/2006 | Riddle | |
| 7,139,843 B1 | 11/2006 | Brown et al. | |
| 7,739,327 B2 | 6/2010 | Mutton et al. | |
| 7,774,323 B2 * | 8/2010 | Helfman | H04L 67/34 707/694 |
| 8,615,569 B2 | 12/2013 | Pearson et al. | |
| 8,949,379 B2 | 2/2015 | Pearson et al. | |
| 2001/0040697 A1 | 11/2001 | Wu et al. | |
| 2002/0040366 A1 * | 4/2002 | Lahr | G06F 17/30887 |
| 2002/0046189 A1 * | 4/2002 | Morita | G06Q 20/04 705/67 |
| 2002/0147840 A1 | 10/2002 | Mutton et al. | |
| 2003/0065803 A1 * | 4/2003 | Heuvelman | H04N 21/25808 709/231 |
| 2005/0144078 A1 | 6/2005 | Janakiraman et al. | |
| 2006/0294434 A1 * | 12/2006 | Ikeda | G06F 11/3688 714/38.1 |
| 2007/0033520 A1 | 2/2007 | Kimzey et al. | |
| 2007/0245409 A1 * | 10/2007 | Harris | H04L 63/0272 726/5 |
| 2007/0271389 A1 | 11/2007 | Joshi et al. | |
| 2007/0276926 A1 | 11/2007 | Lajoie et al. | |
| 2007/0294333 A1 * | 12/2007 | Yang | G06F 17/30899 709/203 |
| 2008/0209491 A1 * | 8/2008 | Hasek | H04N 7/17318 725/114 |
| 2010/0067380 A1 | 3/2010 | Teng | |
| 2010/0088405 A1 | 4/2010 | Huang et al. | |
| 2010/0146529 A1 * | 6/2010 | Heath | H04H 20/12 725/14 |
| 2011/0199915 A1 | 8/2011 | Santhanam et al. | |
| 2012/0042004 A1 * | 2/2012 | Shenfield | G06F 9/542 709/203 |

* cited by examiner

DYNAMIC CONTENT DELIVERY SYSTEMS AND METHODS FOR PROVIDING SAME

CROSS-REFERENCE TO RELATED APPLICATIONS

This Application is a continuation application claiming priority under 35 U.S.C. § 120 to U.S. patent application Ser. No. 14/611,531, filed Feb. 2, 2015, which claims priority to U.S. patent application Ser. No. 14/139,342, filed 23 Dec. 2013, issued as U.S. Pat. No. 8,949,379, which claims priority to U.S. patent application Ser. No. 12/911,322, filed 25 Oct. 2010, issued as U.S. Pat. No. 8,615,569, the entire contents and substance of which are hereby incorporated by reference as if fully set out below.

TECHNICAL FIELD

Various embodiments of the present invention relate to delivery of content from a remote location and, more particularly, to systems and methods for selecting content for delivery based on a dynamic network performance indication.

BACKGROUND

Websites and other systems for delivering remote content may be configured to provide large amounts of data over a network within relatively short periods of time. For example, a server for a graphically-intensive website may need to deliver data corresponding to video, audio, or multimedia over a network in response to a client computer's request for website content. In some instances, the rate at which the data is received by the client computer can greatly affect a user's experience. For example, if the content to be delivered is an audio or video file, then the content must be delivered in a timely enough manner that it can be reconstructed at the client computer to result in audio or video that does not skip or stall unnecessarily. Unfortunately, various aspects of the network are not controlled by the server, and thus, content delivered to the client is not always received in a manner that enables a user at the client to appreciate the delivered content as intended.

Some conventional systems attempt to reduce the above issue of content delivery over a network by determining the bandwidth available to a client computer before transmitting content to the client computer. After determining the bandwidth, a conventional system may reduce the quality of the content, thereby reducing the amount of data transmitted to deliver the content, if the bandwidth is lower than desirable for full quality. The bandwidth determination generally comprises transmitting a file to the client computer and detecting the rate at which the client computer downloads the file. Because repeatedly transmitting the file would be impractical, the bandwidth determination is performed only once, before content delivery beings. Thus, these conventional systems select content for delivery based only on a one-time test and do not react to changing network conditions.

SUMMARY

There is a need for improved systems and methods for selecting delivered content based on a dynamic performance indication. It is to such systems and methods that various embodiments of the present invention are directed.

Briefly described, various embodiments of the present invention are content delivery systems and methods configured to repeatedly receive an indication of network performance, so as to dynamically update content before delivery. In an exemplary embodiment, a content delivery system can comprise a content request unit, a detection unit, and a transmission unit.

The content request unit can receive a request from a remote client for certain content available to the content delivery system. The content request unit can then process the request as needed and can instruct the transmission unit as to what content was requested by the client.

The detection unit can monitor the network and periodically update one or more network performance indicators, which can each indicate an aspect of the network's performance. For example, to update a first network performance indicator, the detection unit can transmit a predetermined number of test data packets to the client and can determine the latency in delivering those test packets. The determined current latency can be compared to a baseline latency of the network, and the first network performance indicator can be updated to be the percentage increase in latency since the baseline latency was calculated. Because determining the network latency need not comprise transmitting an entire file to the client, as in some conventional systems, the latency can be determined in this manner repeatedly as needed. When a network performance indicator is updated, the updated value can then be communicated to the transmission unit.

The transmission unit can receive instructions to deliver content, from the content request unit, and can receive periodic updates to the network performance indicators, from the detection unit. For each available content, the transmission unit can have access to a primary data set embodying that content, as well as one or more alternate data sets also embodying the content. Each alternate data set can differ from the primary data set and the other alternate data sets in some respect. For example, and not limitation, the primary data set can be the highest quality version of a video, and each alternate data set can be the same video in varying degrees of quality. Based on the network performance indicators, the transmission unit can select an appropriate data set to transmit to the client in response to the client's request for content. If an update to a network performance indicator is received while one of the data sets is already being transmitted, the transmission unit can replace the current data set with a different data set corresponding to the same content, as dictated by interpretation of the network performance indicators, for the remainder of the transmission.

The content delivery system can thus respond to changes in network performance by dynamically selecting data in response to a client's request. As a result, the content delivery system can preserve an overall positive experience of a web page or other requested content, even when network performance degrades.

Other embodiments of the present disclosure can include systems and methods for requesting and receiving content from a remote server over a network. In an exemplary embodiment, a method can include transmitting, from a client device and to a remote server, a request to deliver requested content over a network. The method can further include responsive to receiving, at the client device and from the remote server, a test packet comprising a first request for confirmation, transmitting, to the remote server, a first confirmation. Additionally, the method can include receiving, at the client device and from the remote server, a first data set, the first data set being at least a first portion of the requested content, and the first data set comprising a second request for confirmation, and transmitting, to the remote server, a second confirmation. Finally, the method can include receiving, at the client device and from the remote server, a second data set, the second data set being at least a second portion of the requested content, the second portion of the requested content being different from the first portion of the requested content, and the second data set received responsive to determining, by the remote server, a change in network performance based at least in part on a comparison of the first confirmation and the second confirmation.

These and other objects, features, and advantages of the content delivery system will become more apparent upon reading the following specification in conjunction with the accompanying drawing figures.

DETAILED DESCRIPTION

Figure 1:
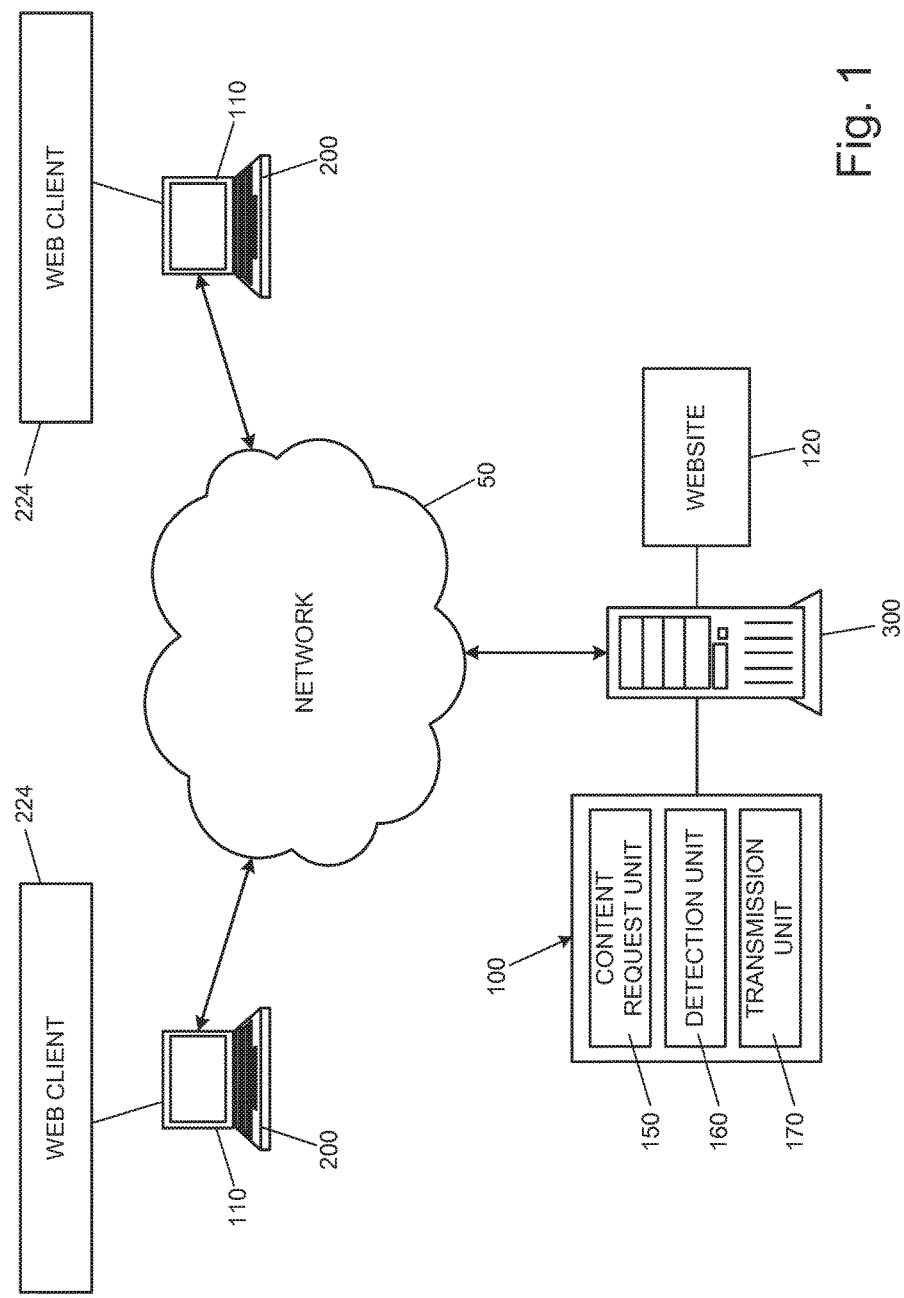
FIG. 1 illustrates a content delivery system, according to an exemplary embodiment of the present invention.

Various embodiments of the present invention are content delivery systems. To facilitate an understanding of the principles and features of the present invention, various illustrative embodiments are explained below. In particular, the invention is described in the context of being a content delivery system for delivering website content to client computers. Embodiments of the invention, however, are not limited to delivering website content. Rather, embodiments of the invention may be used for delivering various types of digital content to various computing devices. For example, and not limitation, an embodiment of the content delivery system may be used to dynamically select and deliver certain data before other data to ensure that a recipient receives high priority data before a predetermined deadline despite degraded network performance.

Embodiments of the content delivery system are described below as embodied in a web environment, but a web environment is not required. References to web components throughout this disclosure are for convenience and should not be considered limiting. For example, and not limitation, embodiments of the content delivery system may be implemented in media centers, video game consoles, operating systems, or virtual machines. The components described hereinafter as making up various elements of the invention are intended to be illustrative and not restrictive. Many suitable components that can perform the same or similar functions as components described herein are intended to be embraced within the scope of the invention. Such other components not described herein may include, but are not limited to, components developed after development of the invention.

Referring now to the figures, in which like reference numerals represent like parts throughout the views, various embodiments of the content delivery system will be described in detail.

FIG. 1 illustrates a content delivery system 100, according to an exemplary embodiment of the present invention. The content delivery system 100 can be embodied in a computer-readable medium and executed by a computer processor on a computing device 110 to provide one, some, or all aspects of the invention. As shown in FIG. 1, the content delivery system 100 can be integrated, in whole or in part, in a computing device 110, which can behave as or include a server 300 to provide services to remote computing devices 110.

A client 200 can request content from the server 300, which can utilize the content delivery system 100 to transmit data to the client 200 in response to the request. For example, and not limitation, the server 300 can provide services for an associated website 120. The client 200 can be or comprise a web client 224 accessing the website 120, and requests for web page content for the website 120 can be issued from the web client 224 to the server 300. These requests for web page content can be handled by the content delivery system 100, which can transmit data embodying web page content back to the client 200. Not all embodiments of the invention need be related to web page content, however, and other forms of content can also be requested of and delivered by the content delivery system 100.

As shown, the client 200 and the server 300 can be in communication over a network 50. Generally, the content delivery system 100 has access to two or more sets of data embodying the content, wherein the data sets differ in one or more respects. The content delivery system 100 can determine one or more performance indicators related to the network 50, and based on the performance indicators, the content delivery system 100 can select which data set embodying the content to deliver to the client 200 in response to the content request.

In some embodiments, for each available content, the data sets differ in quality, such that a primary data set can be the highest quality of available data sets for a particular content. Alternate data sets can be available at lower qualities, and each additional data set can have a reduced total transmission size as compared to the primary data set. Thus, transmitting an alternate data set over the network 50 can be performed more quickly than transmitting the primary data set.

In some other embodiments of the content delivery system 100, however, the alternate data sets need not differ from the primary data set in quality, but other differences can exist. For example, and not limitation, an alternate data set can prioritize or arrange data differently than the primary data set, such that, for example, a first piece of data included in both the primary and the alternate data set is transmitted at an earlier time when the alternate data set is used. Thus, through use of the content delivery system 100, data making up the requested content can be prioritized based on network performance.

The alternate data sets can be generated from the primary data set, and in some embodiments, generation of an alternate data set can occur in real time. For example, and not limitation, the server 300 can comprise or have access to a storage device 214 that can store the primary data set for each content available through the content delivery system 100. When content is requested by a client 200, the content delivery system 100 can access the current values of the performance indicators, and based on the performance indicators, the content delivery system 100 can select either the primary data set corresponding to the requested content or an alternate data set corresponding to the requested content. If an alternate data set is selected, and if that alternate data set is not already stored on the accessible storage device 214, the selected alternate data set can be generated by processing the primary data set. The alternate data set can then be transmitted to the client 200 over the network 50. The content delivery system 100 can periodically update the values of the network performance indicators. If an updated value of a network performance indicator dictates use of a different data set than one currently being transmitted, then the content delivery system 100 can dynamically substitute the appropriate data set for the current one. The content delivery system 100 can thus regulate the transmission of data sets corresponding to requested content, according to performance indicator values, thereby prioritizing performance, functionality, or other quality factors.

As shown in FIG. 1, the content delivery system 100, on or accessible by the server 300, can comprise one or more units for processing content requests and transmitting data to clients 200 in response. The units of the content delivery system 100 can be programs, program modules, or other operative components of the content delivery system 100. These units can comprise, for example, a content request unit 150, a detection unit 160, and a transmission unit 170. Generally, the content request unit 150 can receive and process requests for content received from clients 200; the detection unit 160 can detect performance of the network 50 between the server 300 and the client 200, and can update the performance indicators as needed; and the transmission unit 170 can process content and transmit content across the network 50 to the client 200, as dictated by the network performance indicators.

Although these units are described below as being distinct components of the content delivery system 100, this need not be the case. The units are distinguished herein based on operative distinctiveness, but they can be implemented in various fashions, wherein the elements or components making up the various units can overlap or be divided in a manner other than that described below.

Additionally, although these units are described as being located at the server 300, this also need not be the case. One or more of the units can reside, in whole or in part, at the client 200 or can be distributed across the network 50. For example, and not limitation, one or more operations of the detection unit 160 can be performed by a first client 200 to detect information related to a second client 200, where the two clients are in communication with each other over the network 50. In that case, the first client 200 can gather metrics on the second client 200 and deliver these metrics to the detection unit 160 residing on the server 300.

Figure 2:
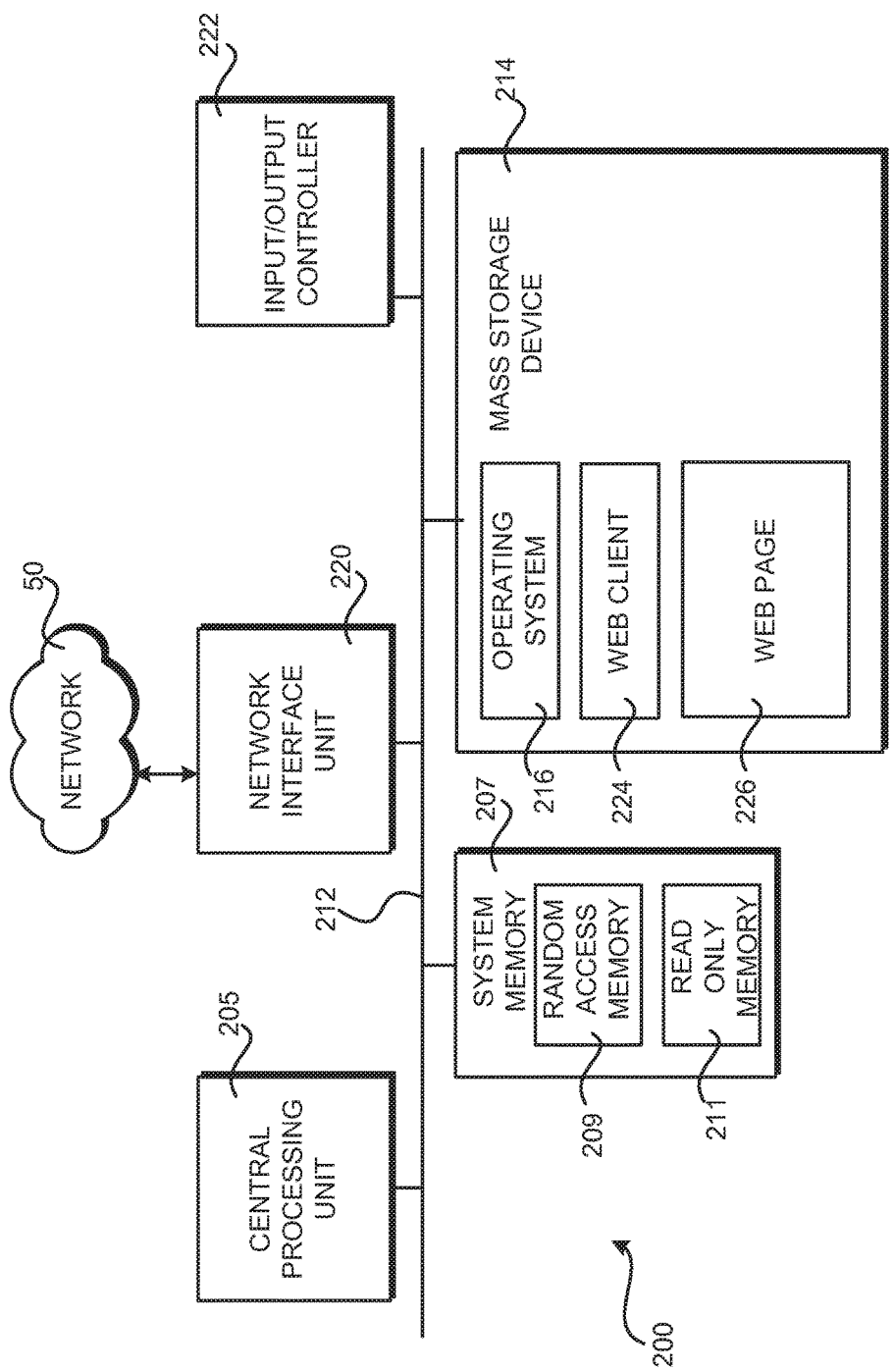
FIG. 2 illustrates an architecture of a client computer of the content delivery system, according to an exemplary embodiment of the present invention.
Figure 3:
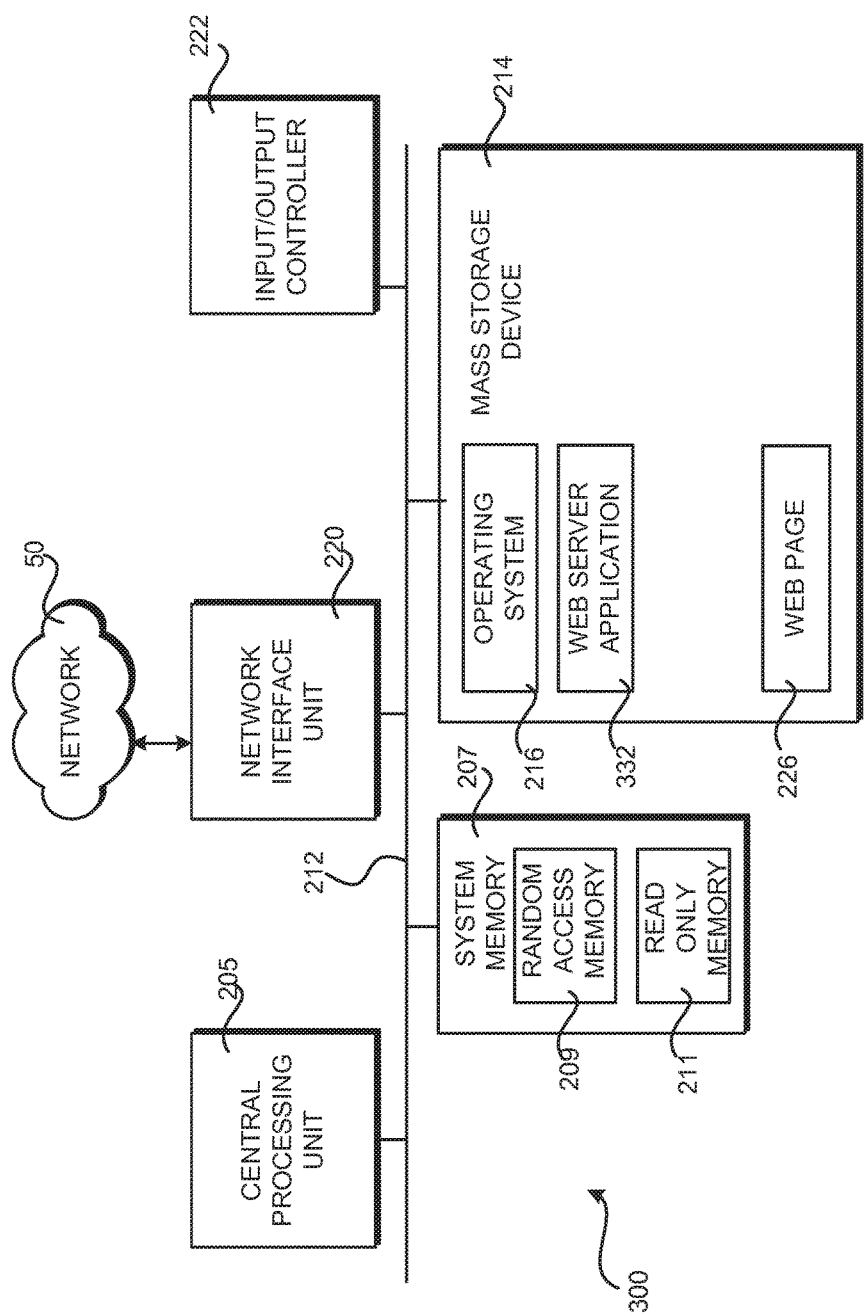
FIG. 3 illustrates an architecture of a server computer of the content delivery system, according to an exemplary embodiment of the present invention.

As shown, the client 200 and the server 300 can be computing devices, such as those illustrated in FIGS. 2 and 3. Alternatively, however, either or both of the client 200 and the server 300 can be one or more processes, applications, or computing devices. For example, and not limitation, the client 200 can be a web client running on a client computing device 110, and the server 300 can be a server process running on a computing device 110 remote from the client computing device 110.

FIGS. 2-3 provide exemplary computer architectures for, respectively, the client 200 and the server 300. Those skilled in the art will recognize that the general architectures described in reference to FIGS. 2-3 are for example only, and can be modified to accommodate various embodiments of the content delivery system 100 and various operational environments.

FIG. 2 illustrates an architecture of a client 200 of the content delivery system 100, where the client 200 is a computing device 110, according to an exemplary embodiment of the present invention. The client 200 can access the website 120 or other interface of the content delivery system 100, over the network 50. As shown in FIG. 2, the client 200 can comprise a central processing unit 205 ("CPU") and one or more system memories 207, such as a random access memory 209 ("RAM") and a non-volatile memory, such as a read-only memory ("ROM") 211. The client 200 can further comprise a system bus 212 coupling together the memory 207, the processing unit 205, and various other components. A basic input/output system containing routines to assist in transferring information between components of the client 200 can be stored in the ROM 211.

The client 200 can comprise, or can be associated with, various forms of computer-readable media. One such form of computer-readable media can be embodied in a mass storage device 214. Although the description of computer-readable media contained herein generally refers to a mass storage device 214, such as a hard disk or CD-ROM drive, it will be appreciated by those skilled in the art that computer-readable media can include many available media accessible by the client 200. The mass storage device 214 can store an operating system 216, application programs, and other program units. The mass storage device 214 can be connected to the CPU 205 through a mass storage controller (not shown) connected to the bus 212. The mass storage device 214 can provide non-volatile storage for the client 200.

Computer-readable media may include computer storage media, such as volatile and non-volatile, removable and non-removable media implemented in many methods or technologies for storage of information, such as computer-readable instructions, data structures, program units, or other data. Computer storage media can include, but is not limited to, RAM, ROM, EPROM, EEPROM, flash memory, other solid state memory technology, CD-ROM, digital versatile disks ("DVD"), other optical storage, magnetic cassettes, magnetic tape, magnetic disk storage, other magnetic storage devices, or many other media that may be used to store the desired data and may be accessible by the client 200 or the server 300. Computer-readable instructions on the storage media of the client 200 can include, for example, instructions for implementing processes, preferably client-side processes, of the content delivery system 100.

According to various embodiments, the client 200 can operate in a networked environment using logical connections to remote computers, such as the server 300, through a network 50, such as the Internet. The client 200 can connect to the network 50 through a network interface unit 220 connected to the bus 212. It will be appreciated that the network interface unit 220 can also be utilized to connect to other types of networks and remote computer systems.

The client 200 can also include an input/output controller 222 for receiving and processing input from a number of other devices, including a keyboard, mouse, or electronic stylus. The input/output controller 222 can provide output to a display screen, a printer, or other type of output device.

A number of program units and data files can be stored in the mass storage device 214 and RAM 209 of the client 200. Such program units and data files can also include an operating system 216 suitable for controlling operations of a networked personal computer. A web client application program, or web client 224, can also be stored on the mass storage device 214 and the RAM 209. The web client 224 can comprise an application program for requesting and rendering web pages 226 created in Hypertext Markup Language ("HTML") or other markup or browser-readable languages. The web client 224 can be capable of executing client side objects, as well as scripts through the use of a scripting host. The scripting host can execute program code expressed as scripts within the browser environment.

Referring now to FIG. 3, the server 300 utilized in various exemplary embodiments of the content delivery system 100 is illustrated. The server 300 can receive and respond to requests from clients 200 for operation of the content delivery system 100. Those skilled in the art will recognize that the server 300 illustrated in FIG. 3 is an exemplary server configuration and can be modified to accommodate various embodiments of the content delivery system 100. As shown in FIG. 3, the server 300 can include many of the conventional computing components included in the client 200 and described above with respect to FIG. 2. In particular, the server 300 can include a processing unit 205, a network interface unit 220 connected to the network 50, a system memory 207, and a mass storage device 214.

The mass storage device 214 utilized by the server 300 can typically be operative to store an operating system 216 suitable for servicing the website 120, if applicable, and for controlling operations of a server computer. The mass storage device 214 and its associated computer-readable storage media can provide non-volatile storage for the server 300. Computer-readable instructions on computer-readable storage media of the server 300 can include, for example, instructions for implementing processes, preferably server-side processes, of the content delivery system 100.

In some embodiments, the server 300 can utilize a web server application 332. The web server application 332 may receive and respond to requests from web clients 224 at remote computers, such as the client 200, for web pages 226 located at or accessible to the server 300. It will be appreciated that web pages 226, as described herein, include both those pages stored statically and utilizing only HTML, as well as pages generated dynamically through use of server-side scripting technologies.

Figure 4:
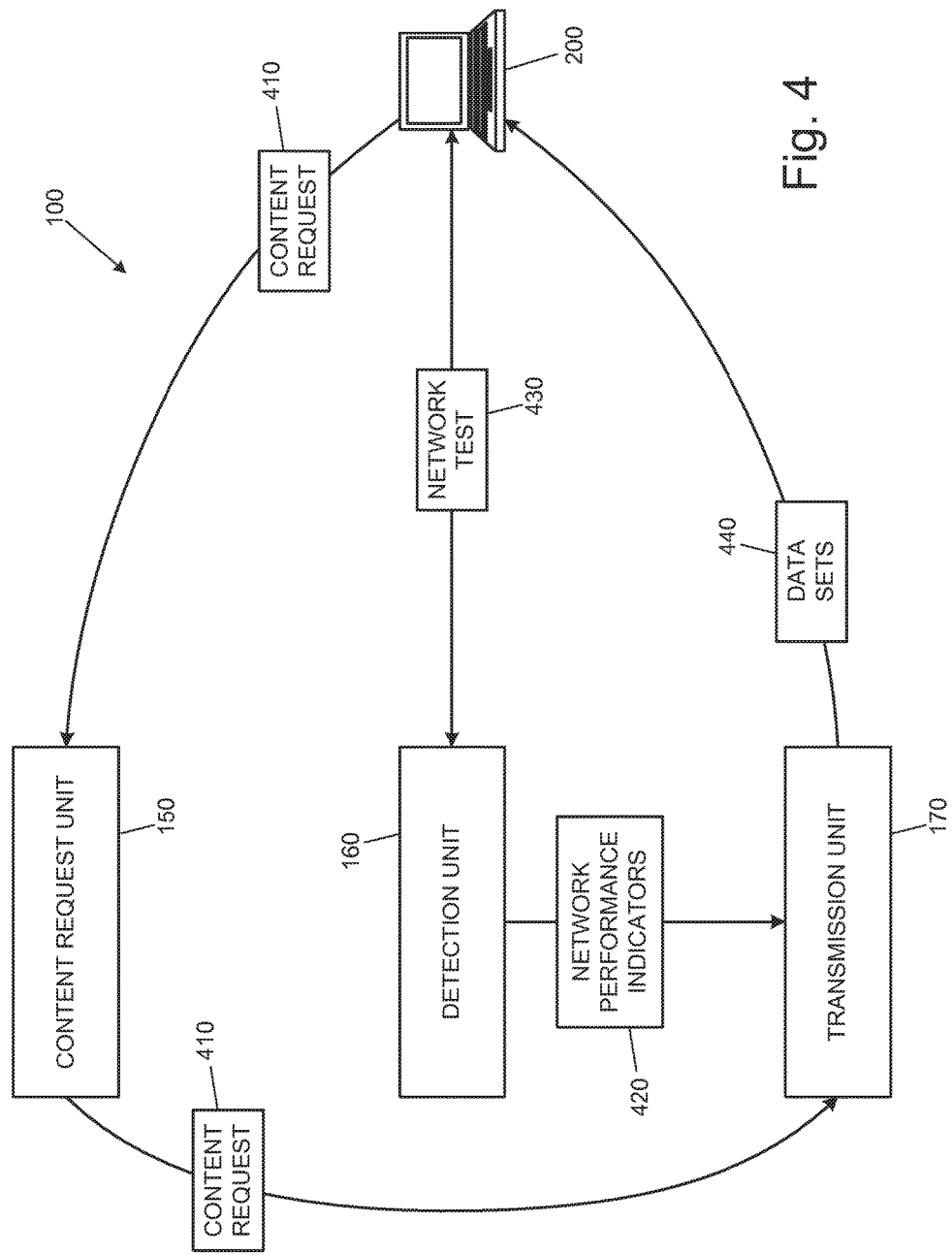
FIG. 4 illustrates a diagram of interactions occurring in the content delivery system, according to an exemplary embodiment of the present invention.

FIG. 4 illustrates a diagram of interactions that can occur for operation of the content delivery system 100. As shown in FIG. 4, the client 200 and the content request unit 150 can be in communication with each other, so that the client 200 can transmit content requests 410 to the content request unit 150. The content request unit 150 can also be in communication with the transmission unit 170 to instruct the transmission unit 170 as to which content to deliver to the client 200. The detection unit 160 can be in communication with the client 200, so as to transmit data to the client 200 as needed to detect information about performance of the network 50 and to detect characteristics and performance of the client 200. The detection unit 160 can also be in communication with the transmission unit 170, to provide updated indications of the network's performance. In addition to being in communication with the content request unit 150 and the detection unit 160, the transmission unit 170 can also be in communication with the client 200, so as to transmit data to the client 200 in response to the client's request 410 for content.

The client 200 can initiate content delivery by requesting content from the content request unit 150. The content request 410 from the client 200 can take various forms. In some exemplary embodiments, the request 410 can be a request for a web page to be delivered from the server 300 to the client 200 for display on a web client associated with the client 200. The content request 410 can be a hypertext transfer protocol (HTTP) request for web page content. Alternatively, for another example, the content request 410 can be an FTP request, whereby the client 200 requests that a file be downloaded from the server 300.

Upon receiving the content request 410, the content request unit 150 can process the request 410 as needed and then relay instructions to the transmission unit 170. Processing the request 410 can include, for example, identifying the storage location of the content corresponding to the content request 410, parsing the request 410 so that the storage location can be identified by the transmission unit 170, identifying a location of the client 200, or various other tasks. After processing of the request 410 is performed, the content request unit 150 can instruct the transmission unit 170 to deliver the requested content to the client 200.

The detection unit 160 can detect an initial state of the network, and can periodically update one or more network performance indicators 420. Each network performance indicator can be a value or set of values that indicate performance of the network 50 between the content delivery system 100 and the client 200. The network performance indicators 420 can be communicated to and used by the transmission unit 170 to determine which data to deliver to the client 200 in response to the content request 410.

Before transmission of the requested content begins, or soon after transmission begins, the detection unit 160 can detect initial characteristics of the network 50. For example, and not limitation, initially detected characteristics can include the client's bandwidth, the network's initial latency, or both. As will be discussed in more detail below, the transmission unit 170 can select an active data set corresponding to the requested content, and that active data set can be transmitted to the client 200 in response to the content request 410. The initially detected characteristics of the network can be communicated from the detection unit 160 to the transmission unit 170, and then used by the transmission unit 170 to select the first, or initial, active data set 440 for the requested content. For example, and not limitation, if the detection unit 160 initially detects that the client 200 has a high bandwidth, and the network 50 has a low latency, the first active data set 440 can be selected to be the largest or highest quality data set 440 available for the requested content. In contrast, if the client 200 has a relatively low bandwidth, and the network 50 has a relatively high latency, then the transmission unit 170 can select a smaller or lower quality data set 440 as the first active date set 440. Alternatively, some exemplary embodiments of the content delivery system 100 can automatically select the largest and highest quality data set as the first active data set 440.

The detection unit 160 can continuously or periodically track, monitor, or otherwise detect one or more aspects of the network's performance, and the detected performance can be represented by the network performance indicators 420. The aspects of network performance detected can be, for example, a combination of latency, bandwidth, or other factors. Detection of network performance can take various forms. For example, and not limitation, the detection unit 160 can passively receive information from network 50 resources, or can periodically perform network tests 430, the result of which can be used as the network performance indicators 420 or as a basis for determining the network performance indicators 420.

A network test 430 can comprise performing one or more tasks related to the network 50 and observing the result of the tasks. If the network test 430 comprises determining the latency of the network 50, for example, the detection unit 160 can perform this network test 430 by transmitting a test data packet to the client 200 and then determining the delay, i.e., the latency, in delivering the test packet. The detection unit 160 can request a receipt confirmation for the test packet, and when the confirmation arrives, the detection unit 160 can calculate the latency as half of the time between outputting the test packet and receiving the receipt confirmation. Alternatively, the receipt confirmation can include a timestamp, and the latency can be calculated as the time between the timestamp and when the detection unit 160 output the test packet.

While, in some embodiments, the test packets used during a network test can be packets transmitted to the client 200 specifically for testing purposes, this need not be the case. In some other embodiments, for example, the data sets 440 delivered to the client 200 in response to a content request 410 can also act as test packets. Thus, the detection unit 160 can detect the performance of the network 50 in handling the delivery of the requested content to the client 200, and can update the performance indicators 420 based on that detected performance.

To more accurately determine current performance of the network 50, the network test 430 can comprise repeatedly performing a task and selecting a statistically significant result of the repeated tasks. For example, a plurality of test packets can be transmitted to the client 200. The number of test packets transmitted during a single network test 430 can be implementation-dependent, such as, for example, a fixed predetermined number of test packets, or as many test packets as can be transmitted within a predetermined timeframe. The average of the calculated latencies can be used to determine the network performance indicator 420. It will be understood that the term "average" can refer not only to the statistical mean of a set of data but can also refer to the median or the mode.

The value of a particular, exemplary network performance indicator 420 can be at least partially based on a comparison between a current state of the network 50 and a previous state of the network 50 or, more specifically, a comparison between a current result of the network test 430 and a previous result of the network test 430. Thus, the network performance indicator 420 can indicate changes in network performance, as opposed to just current network performance. In some embodiments, a baseline network test 430 can be performed to determine a state of the network 50 at an initial time, preferably before significant content has been transferred between the server 300 and the client 200. For example, and not limitation, the baseline test can be performed when a user of the client 200 logs into the website 120 or when the client 200 initiates a new session with the server 300. The baseline network test 430 can be substantially the same as later network tests 430, and the result of the baseline test can be stored for later comparison. In some embodiments, the current result of the network test 430 can always be compared against the baseline result, but in other embodiments, some other previous result can alternatively or additionally be selected for comparison.

After a network test 430 is performed, a network performance indicator 420 can be updated to reflect the result of the most recent network test 430. For examples, and not limitation, a network performance indicator 420 can be updated to be the current latency calculated from averaging the travel time of a plurality of test packets; a network performance indicator 420 can be updated to be the ratio of the current network test 430 result to a selected previous network test 430 result, such as the baseline test result; a network performance indicator 420 can be updated to be a percentage by which the network latency has changed since the baseline network test 430; or a network performance indicator 420 can be updated to represent a measure of throughput, which can be calculated based on one or more of the initial latency, historical latency, and the current latency.

Figure 5:
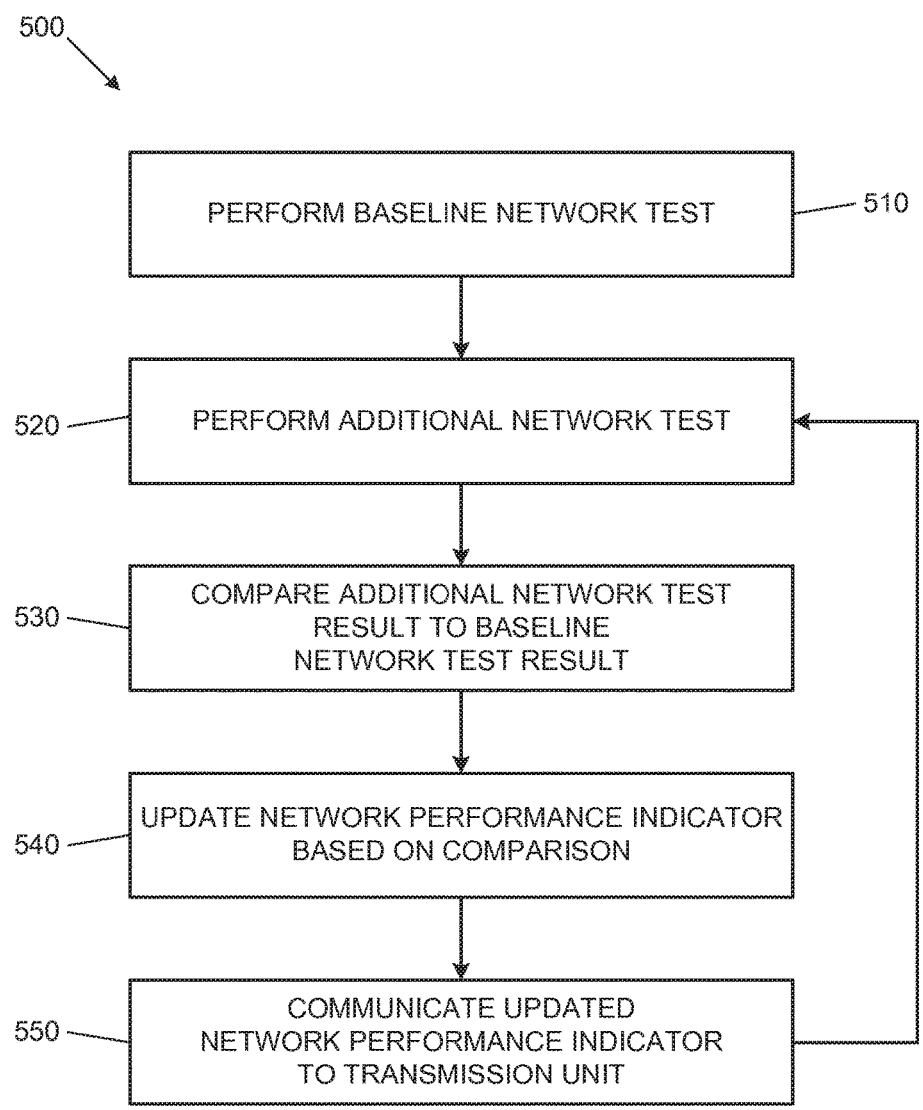
FIG. 5 illustrates a flow diagram of a method of updating a network performance indicator of the content delivery system, according to an exemplary embodiment of the present invention.

FIG. 5 illustrates a flow diagram of a method 500 for determining a network performance indicator 420. As shown in FIG. 5, at 510, a network test 430 can be performed to determine a baseline performance of the network 50. In some embodiments, the network test 430 can comprise averaging the latencies calculated for a plurality of test packets transmitting to the client 200. At 520, the network test 430 can be performed again, at a later time, to determine a current performance of the network 50. At 530, the current network performance can be compared to a previous network performance, such as the baseline performance, to yield a comparison result. At 540, the network performance indicator 420 can be set to a new value based on the comparison. At 550, the updated network performance indicator 420 can be communicated to the transmission unit 170. After the network performance indicator 420 is calculated, the method 500 can return to 520 to perform the network test 430 again, so as to periodically update the network performance indicator 420 based on current performance of the network 50.

For an example of the above, suppose that a user of the client 200 logs into the website 120 over a network 50, where the website 120 is serviced by the server 300, which utilizes the content delivery system 100 to transmit website 120 content to website 120 users. When the user logs in, the content delivery system 100 can transmit a plurality of test packets to the client 200 to determine a baseline latency of the network 50. Website content can initially be transmitted to the client 200 in highest quality form. Periodically, the content delivery system 100 can transmit another set of test packets to the client 200, and based on the travel times of this set of test packets, the content delivery system 100 can determine a current latency of the network 50. A first network performance indicator 420 can be updated to be the current latency of the network 50. The current latency can then be compared against the baseline latency to yield a second network performance indicator 420, which can be a percentage by which the current latency is an increase over the baseline latency. If the baseline latency is 100 ms, for example, and the current latency is 180 ms, then this second network performance indicator 420 can be 80%. It will be understood that, while this example utilizes two network performance indicators 420, various numbers of network performance indicators 420 can be used, and not all network performance indicators 420 need be based on the same network test 430, i.e., a latency test comprising transmitting a plurality of test packets.

Both of the above-described exemplary network performance indicators 420 can be useful for different reasons and, thus, used for different purposes. The current latency can be particularly useful in determining the perceived quality to the user of interactive content. For example, if two users are using a video chat feature of the website 120, it is desirable for the current latency to be low, so that the users can effectively interact with each other. In contrast, for unidirectional content, such as a prerecorded streaming video being delivered to the client 200, the change in latency can be more indicative of perceived quality. If the latency is consistent, even if the latency is large, data packets of the streaming video will arrive at generally the same intervals at which they were outputted from the server 300. Thus, while the current latency can determine the timeframe for receiving the first data packet of the video, the streaming video can be smoothly reconstructed because the remaining data packets will be delivered within the same timeframe. If the latency is increasing, however, the data packets will arrive at the client 200 spaced farther apart than they were outputted. Accordingly, the change in latency can be determinative of how the content is reconstructed at the client 200.

Referring now back to FIG. 4, the transmission unit 170 can have access to contents available for request by the client 200. For example, if the content delivery system 100 is associated with a website 120, the transmission unit 170 can have access to data for the web pages of the website 120. A requestable content can be embodied in one or more different data sets 440, including a primary data set 440 and optional one or more alternate data sets 440, each of which can be versions of the requested content. In an exemplary embodiment, the primary data set 440 can be the largest or highest quality version of the requested content that is available to the transmission unit 170. At least one of the data sets 440, for example, the primary data set 440, for each content can be stored on a storage device 214 accessible to the transmission unit 170. The corresponding other data sets 440, for example, the alternate data sets 440, can also be stored on the storage device 214 or, alternatively, can be generated on the fly from the corresponding primary data set 440 or from a corresponding other alternate data set, as needed before being transmitted to the client 200.

Upon receiving a request 410 to deliver content to a client 200, which request 410 can be communicated from the content request unit 150, the transmission unit 170 can select one of the data sets 440 embodying the requested content to be the active data set, and can transmit the selected, active data set 440 to the client 200 in response to the content request 410. In some embodiments, the transmission unit 170 can initially select the primary data set 440 as the active data set 440, and can begin transmitting the primary data set 440 to the client 200.

As the network performance indicators 420 are updated by the detection unit 160, the transmission unit 170 can select a different data set 440 as the active set, wherein the active data set 440 is the data set currently being transmitted to the client 200 to fulfill the content request 410. Selection of the active data set 440 can depend, in whole or in part, on the one or more available network performance indicators 420 provided by the detection unit 160. For example, and not limitation, if the requested content is interactive content, a network performance indicator 420 related to current latency can be used to select a data set to transmit to the client 200. If the requested content is unidirectional content, however, a network performance indicator 420 related to a change in latency, such as the ratio between current and baseline latencies, can be used to select a particular data set.

The transmission unit's selection of an active data set 440 can also depend, to some degree, on user preferences associated with the client 200. In some embodiments, a user associated with the client 200 can indicate default transmission preferences. For example, the user can indicate to the content delivery system 100 that the initially active data set 440 should always be the highest quality data set 440 available for requested content, or the user can indicate the initially active data set 440 should be the lowest quality data set 440 available. The user can also provide the content delivery system 100 with guidelines as to what values of performance indicators 420 trigger switches between data sets 440. The transmission unit 170 can comply with these preferences when selecting an active data set 440 in answer to a content request 410. In short, the use of preferences can enable a user to customize his or her experience based on the performance indicators 420 or other environmental conditions.

For each network performance indicator 420, the transmission unit 170 can establish or otherwise have access to a set of predetermined ranges of potential values for that network performance indicator 420. For example, for a network performance indicator 420 whose value is the percentage increase in latency from the baseline latency to the current latency, the predetermined ranges of the values can be as follows: [NPI<25%; 25%≤NPI<50%; 50%≤NPI<75%; NPI≥75%], where "NPI" refers to the value of the network performance indicator 420. In an exemplary embodiment, there can be a one-to-one correspondence between the number of ranges of potential values of the network performance indicator 420 and the number of data sets 440 corresponding to requested content, so that each available data set corresponds to one and only one predetermined range of values. If, for example, the network performance indicator 420 is 35%, then the transmission unit 170 can select as the active data set 440 the data set 440 corresponding to the second range of values above.

As mentioned previously, the different data sets 440 for a single content can differ from one another. In an exemplary embodiment, the data sets 440 can be created to provide the user at the client 200 with a good experience during receipt of the content. If the requested content is content of a web page, then the content delivery system 100 can be configured to select data to supply the web page content in a manner that provides the user with a positive website 120 experience. For example, if the requested content is streaming video on the website 120, then the primary data set 440 can be the highest quality version of the video. This primary data set 440 can selected as the initial active data set 440 and can be transmitted to the user until a network performance indicator 420 indicates that the latency of the network 50 has changed so as to place to the value of the network performance indicator 420 in a different predetermined range. As a result, an alternate data set 440 can be selected as the newly active data set 440 for transmission of the remainder of the video, or for transmission until the network performance indicators 420 dictate yet another change in the active data set 440. The selected alternate data set 440 can represent, for example, a lower quality version of the video, which can be transmitted to the client 200 so that the data packets of the alternate data set arrive close enough together to enable the user to view and properly experience the streaming video. The alternate data set can be previously stored on a storage device 214 accessible to the transmission unit 170, or it can be generated in real time, such as by compressing portions of the remainder of the primary data set 440, e.g., the high quality streaming video, before transmitting them to the client 200. The active data set 440 being transmitted to the client 200 can change dynamically based on the current state of the network performance indicators 420, which can be periodically updated by the detection unit 160.

Depending on the purposes or implementation of an embodiment of the content delivery system 100, an alternate data set 440 need not be a lower quality version of a primary data set 440. For example, and not limitation, an alternate data set 440 can be a rearranged version of the primary data set 440, or can exclude data from or add data to the primary data set 440. For example, a content delivery system 100 can be configured to ensure that high priority data is delivered within certain time constraints. In such an embodiment, a primary data set 440 for requested content can contain data describing a set of events in chronological order. If a network performance indicator 420 indicates to the transmission system that latency has increased past a predetermined threshold, the data in the primary data set 440 can be rearranged into an alternate data set, so as to result in the high priority event data arriving at the client 200 first. In this manner, the content delivery system 100 can ensure that the high priority data arrives at the client 200 within the given time constraints. Of course, other implementations can also be provided in various embodiments of the content delivery system 100.

Figure 6:
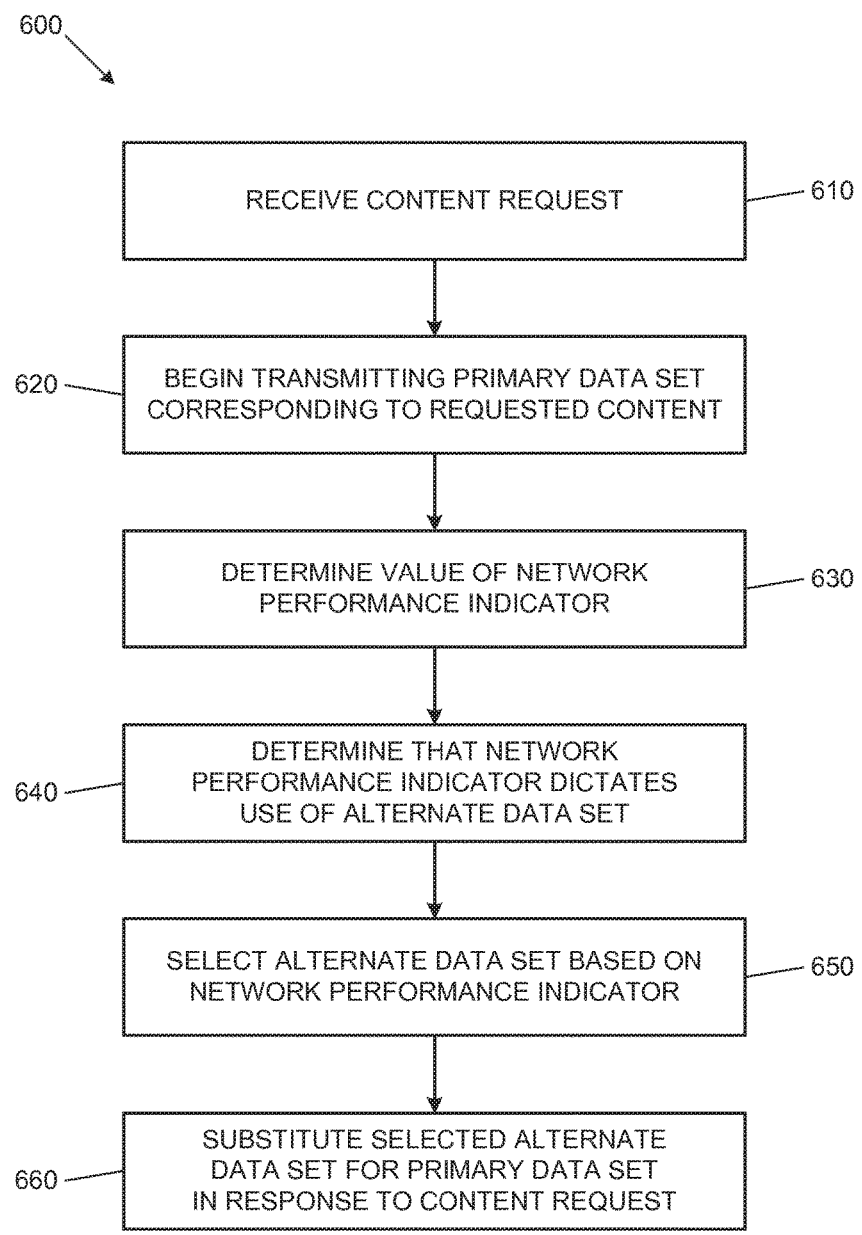
FIG. 6 illustrates a flow diagram of a method of dynamically selecting data for delivery in response to a content request, according to an exemplary embodiment of the present invention.

FIG. 6 illustrates an exemplary method 600 of transmitting content to a client 200 in response to a content request 410. As shown, at 610, a content request 410 can be received from a remote client 200. At 620, transmission of the content to the client 200 begins, by transmitting portions of a primary data set 440 embodying the requested content. For example, the first ten seconds of the highest available quality version of a streaming video can be transmitted to the client 200. At 630, a current network performance indicator 420 can be determined. At 640, it can be determined that the current network performance indicator 420 dictates selection of an alternate data set 440. At 650, an alternate data set 440 can be selected based on the current network performance indicator 420. At 660, transmission of the content continues with transmission of portions of the alternate data set 440 embodying a remaining portion of the requested content. Returning to the above example, if after transmission of the first ten seconds of the video, the network performance indicator 420 is updated and resultantly dictates a lower quality streaming video, then a lower quality version of the video can then be transmitted to the client 200, beginning after the first ten seconds.

An additional beneficial feature of some embodiments of the content delivery system 100 is its ability to prioritize portions of the requested content. Where the client 200 has requested web page content, for example, the web page can include distinct sections or portions of content. For example, a web page can include an interactive instant messaging frame, a photo album, and a streaming video. The content delivery system 100 can assign priorities, or weights, to each of these portions of the web page content, or the priorities can be previously integrated into predetermined alternate data sets 440 for the overall web page content. When an updated network performance indicator 420 dictates that a different data set should replace the active data set 440 currently being transmitted in response to a content request 410, the weights of the portions of the web page can be considered to determine how to select or generate an alternate data set 440 for the content. For example, through prioritizing, the content delivery system 100 can account for the fact that providing a high quality streaming video to the client 200 may significantly impact performance of the remainder of the web page, because properly streaming the video may require that packets be delivered on a schedule sufficient to adequately reconstruct the video at the client 200. Thus, if a network performance indicator 420 indicates that latency has increased, an alternate data set 440 can be provided with a lower quality video, and additionally, the alternate data set 440 can prioritize the video packets over the photo album packets to ensure that the video is accurately reconstructed. Alternatively, for another example, the resolution of the photos may be reduced in an alternate data set 440, so as to enable interactivity in the instant messaging chat and to enable a high quality video to be streamed to client 200, if the quality of the video is given high priority in the content delivery system 100. It will be understood that many implementations can be used to manage the weights and priorities of portions of web page content or other requested content, so as to provide an overall positive experience from the perspective of the client 200.

In some exemplary embodiments of the content delivery system 100, an additional beneficial feature is the ability to intelligently and automatically balance the transmission load across multiple servers 300. If multiple servers 300 are utilized in the content delivery system 100, then the performance indicators 420 can vary between each server-client pair. For example, a first set of performance indicators 420 can apply between a first server 300 and a client 200, while a second set of performance indicators can apply between a second server 300 and the same client 200. If the second set of performance indicators 420 suggests a better performance in delivering data between the second server 300 and the client 200, as opposed to between the first server 300 and the client 200, then the content delivery system 100 can satisfy the client's content request 410 through the second server 300. The server 300 used to satisfy a particular content request 410 or multiple content requests 410 from the client 200 can be dynamically changed based on updates to the respective performance indicators 420. As a result, the content delivery system 100 can provide improved scalability and load-balancing over conventional systems.

Embodiments of the present invention can thus provide an effective means of dynamically selecting appropriate available data to deliver across a network 50, based on network performance, so as to provide a positive overall experience from the perspective of a client 200. Accordingly, embodiments of the content delivery system 100 can effectively service even a graphically-intensive website.

While the content delivery system has been disclosed in exemplary forms, many modifications, additions, and deletions may be made without departing from the spirit and scope of the system, method, and their equivalents, as set forth in the following claims.

What is claimed is:

1. A method comprising:
   transmitting, from a client device and to a remote server, a request to deliver requested content over a network;
   responsive to receiving, at the client device and from the remote server, a test packet comprising a first request for confirmation, transmitting, to the remote server, a first confirmation;
   receiving, at the client device and from the remote server, a first data set, the first data set being at least a first portion of the requested content, and the first data set comprising a second request for confirmation;
   transmitting, to the remote server, a second confirmation; and
   receiving, at the client device and from the remote server, a second data set, the second data set being at least a second portion of the requested content, the second portion of the requested content being different from the first portion of the requested content, and the second data set received responsive to determining, by the remote server, a change in network performance based at least in part on a comparison of the first confirmation and the second confirmation.

2. The method of claim 1, wherein the requested content comprises content of a web page.

3. The method of claim 1, wherein the second portion of the requested content has a smaller transmission size than the first portion of the requested content.

4. The method of claim 1, wherein the first data set is a primary data set and the second data set is an alternate data set.

5. The method of claim 1, wherein the first data set is of higher quality than the second data set.

6. The method of claim 1, wherein the first confirmation comprises a timestamp.

7. The method of claim 1, wherein the change in network performance is a reduction in network latency.

8. A system comprising:
at least one processor;
a first server having a memory for storing a first data set;
a second server having a memory for storing a second data set;
at least one memory operatively coupled to the at least one processor and configured for storing data and instructions that, when executed by the processor, cause the system to perform a method comprising:
transmitting, from a client device and to a remote server, a request to deliver requested content over a network;
responsive to receiving, at the client device and from the remote server, a test packet comprising a first request for confirmation, transmitting, to the remote server, a first confirmation;
receiving, at the client device and from the remote server, a first data set, the first data set being at least a first portion of the requested content, and the first data set comprising a second request for confirmation;
transmitting, to the remote server, a second confirmation; and
receiving, at the client device and from the remote server, a second data set, the second data set being at least a second portion of the requested content, the second portion of the requested content being different from the first portion of the requested content, and the second data set received responsive to determining, by the remote server, a change in network performance based at least in part on a comparison of the first confirmation and the second confirmation.

9. The system of claim 8, wherein the requested content comprises content of a web page.

10. The system of claim 8, wherein the second portion of the requested content has a smaller transmission size than the first portion of the requested content.

11. The system of claim 8, wherein the first data set is a primary data set and the second data set is an alternate data set.

12. The system of claim 8, wherein the first data set is of higher quality than the second data set.

13. The system of claim 8, wherein the first confirmation comprises a timestamp.

14. The system of claim 8, wherein the change in network performance is a reduction in network latency.

15. A computer-program product embodied in a non-transitory computer-readable storage medium having instructions encoded thereon that, when executed by a computing device, causes the computing device to perform a method comprising:
transmitting, from a client device and to a remote server, a request to deliver requested content over a network;
responsive to receiving, at the client device and from the remote server, a test packet comprising a first request for confirmation, transmitting, to the remote server, a first confirmation;
receiving, at the client device and from the remote server, a first data set, the first data set being at least a first portion of the requested content, and the first data set comprising a second request for confirmation;
transmitting, to the remote server, a second confirmation; and
receiving, at the client device and from the remote server, a second data set, the second data set being at least a second portion of the requested content, the second portion of the requested content being different from the first portion of the requested content, and the second data set received responsive to determining, by the remote server, a change in network performance based at least in part on a comparison of the first confirmation and the second confirmation.

16. The computer-program product of claim 15, wherein the requested content comprises content of a web page.

17. The computer-program product of claim 15, wherein the second portion of the requested content has a smaller transmission size than the first portion of the requested content.

18. The computer-program product of claim 15, wherein the first data set is a primary data set and the second data set is an alternate data set.

19. The computer-program product of claim 15, wherein the first data set is of higher quality than the second data set.

20. The computer-program product of claim 15, wherein the change in network performance is a reduction in network latency.

* * * * *